US010754737B2

(12) United States Patent
Kulkarni et al.

(10) Patent No.: US 10,754,737 B2
(45) Date of Patent: Aug. 25, 2020

(54) BOOT ASSIST METADATA TABLES FOR PERSISTENT MEMORY DEVICE UPDATES DURING A HARDWARE FAULT

(71) Applicant: DELL PRODUCTS, L.P., Round Rock, TX (US)

(72) Inventors: Yogesh P. Kulkarni, Round Rock, TX (US); Shekar Babu Suryanarayana, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 254 days.

(21) Appl. No.: 16/005,935

(22) Filed: Jun. 12, 2018

(65) Prior Publication Data
US 2019/0377644 A1  Dec. 12, 2019

(51) Int. Cl.
*G06F 11/14* (2006.01)

(52) U.S. Cl.
CPC .... *G06F 11/1471* (2013.01); *G06F 2201/805* (2013.01); *G06F 2201/82* (2013.01)

(58) Field of Classification Search
CPC ... G06F 11/14; G06F 11/1471; G06F 11/1417
USPC .......................................................... 714/20
See application file for complete search history.

(56) References Cited

U.S. PATENT DOCUMENTS

| | | | | |
|---|---|---|---|---|
| 6,910,150 B2* | 6/2005 | Mashayekhi | ....... | G06F 11/1666 709/246 |
| 9,600,378 B2* | 3/2017 | Nelogal | ............... | G06F 11/1469 |
| 2005/0193230 A1* | 9/2005 | Springer | ............. | G06F 11/1441 714/5.11 |
| 2014/0279941 A1* | 9/2014 | Atkisson | ............. | G06F 16/2365 707/690 |
| 2017/0177452 A1* | 6/2017 | Parab | ................... | G06F 11/1471 |
| 2017/0255415 A1* | 9/2017 | Bubeyko | ............... | G06F 11/079 |
| 2017/0308602 A1* | 10/2017 | Raghunathan | ........ | G06F 16/273 |
| 2017/0322967 A1* | 11/2017 | Ganjihal | ............. | G06F 16/2228 |
| 2019/0114427 A1* | 4/2019 | Suryanarayana | ....... | G06F 21/53 |
| 2019/0171580 A1* | 6/2019 | Suryanarayana | ..... | G06F 12/109 |

(Continued)

OTHER PUBLICATIONS

Intel Corporation, "NVDIMM Block Window Driver Writer's Guide", Jul. 2016.

*Primary Examiner* — Kamini B Patel
(74) *Attorney, Agent, or Firm* — Isidore PLLC

(57) ABSTRACT

A method and data processing device for enabling a write operation to track meta-data changes during a hardware fault in an information handling system (IHS). The method includes generating an indexing map to track memory space attributes of a persistent memory device. The method includes generating a subsequent indexing map that is a duplicate of a first indexing map. The method includes communicatively linking each of the indexing maps. The method includes distributing a subsequent indexing map to one or more memory devices. In response to detection of an update to meta-data associated during a hardware fault, the method includes identifying an indexing map that is stored on a writeable memory device. In response to detection of the hardware fault the method includes writing memory space attributes to the writeable indexing map. The method includes synchronizing a master indexing map to each other indexing map to coordinate changes to the memory space attributes.

20 Claims, 7 Drawing Sheets

(56) References Cited

U.S. PATENT DOCUMENTS

2019/0188020 A1\* 6/2019 Ponnuru ............. G06F 9/45558
2019/0278509 A1\* 9/2019 Suryanarayana ..... H04L 9/0833

\* cited by examiner

BOOT ASSIST METADATA TABLES FOR PERSISTENT MEMORY DEVICE UPDATES DURING A HARDWARE FAULT

BACKGROUND

1. Technical Field

The present disclosure relates in general to memory devices of an information handling system (IHS), and more particularly to a method and system for protecting metadata associated persistent memory devices.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can include non-volatile dual inline memory modules (NVDIMMs) that preserve data indefinitely after a system input power failure or normal power down mode. In the event of a power failure, the module copies the data from the volatile traditional dynamic-random access memory (DRAM) to persistent flash storage and copies the data back when power is restored, thereby, enabling data to be retrieved from the NVDIMM by the IHS. However, mounting namespaces in a NVDIMM memory region in read/write mode is decided based on several factors. One of the key factors is NVDIMM battery status. During an NVDIMM battery fail and/or weak status, the NVDIMM basic input/output system (UEFI) drivers identify NVDIMM memory regions. As a result of the battery fail and/or weak status, NVDIMM UEFI places the NVDIMM memory regions in a read only mode. Therefore, no writes for the operating system drivers are allowed to utilize the NVDIMM memory regions.

BRIEF SUMMARY

Disclosed are a method and an information handling system for tracking, synchronizing, and recovering meta-data changes associated with a persistent memory device of an information handling system (IHS) that occur during the event of a hardware fault.

According to illustrative embodiments of the present disclosure, a method includes enabling, by a processor executing a firmware interface of an information handling system (IHS), a write operation to track meta-data changes during a hardware fault in an IHS. The method includes generating, by the processor, a first indexing map to track memory space attributes associated with a persistent memory device. The memory space attributes point to meta-data stored on at least one persistent memory device from among a plurality of persistent memory devices. The method also includes generating at least one subsequent indexing map that is a duplicate of the first indexing map. Further, the method includes communicatively linking the first indexing map to the subsequent indexing map. The method includes distributing the subsequent indexing map to one or more mapping memory devices. In response to detection of an update to meta-data associated with the memory space attributes in an event of a hardware fault, the method includes identifying one of the (i) first indexing map and (ii) the subsequent indexing map that is stored on the mapping memory device as a writeable indexing map. In response to detection of the hardware fault, the method includes writing information defining memory space attributes to at least one of the first indexing map and the subsequent indexing map to generate a master indexing map. The method further includes synchronizing, via a runtime operation, the master indexing map to each of the first indexing map and the subsequent indexing map to coordinate changes to the memory space attributes.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
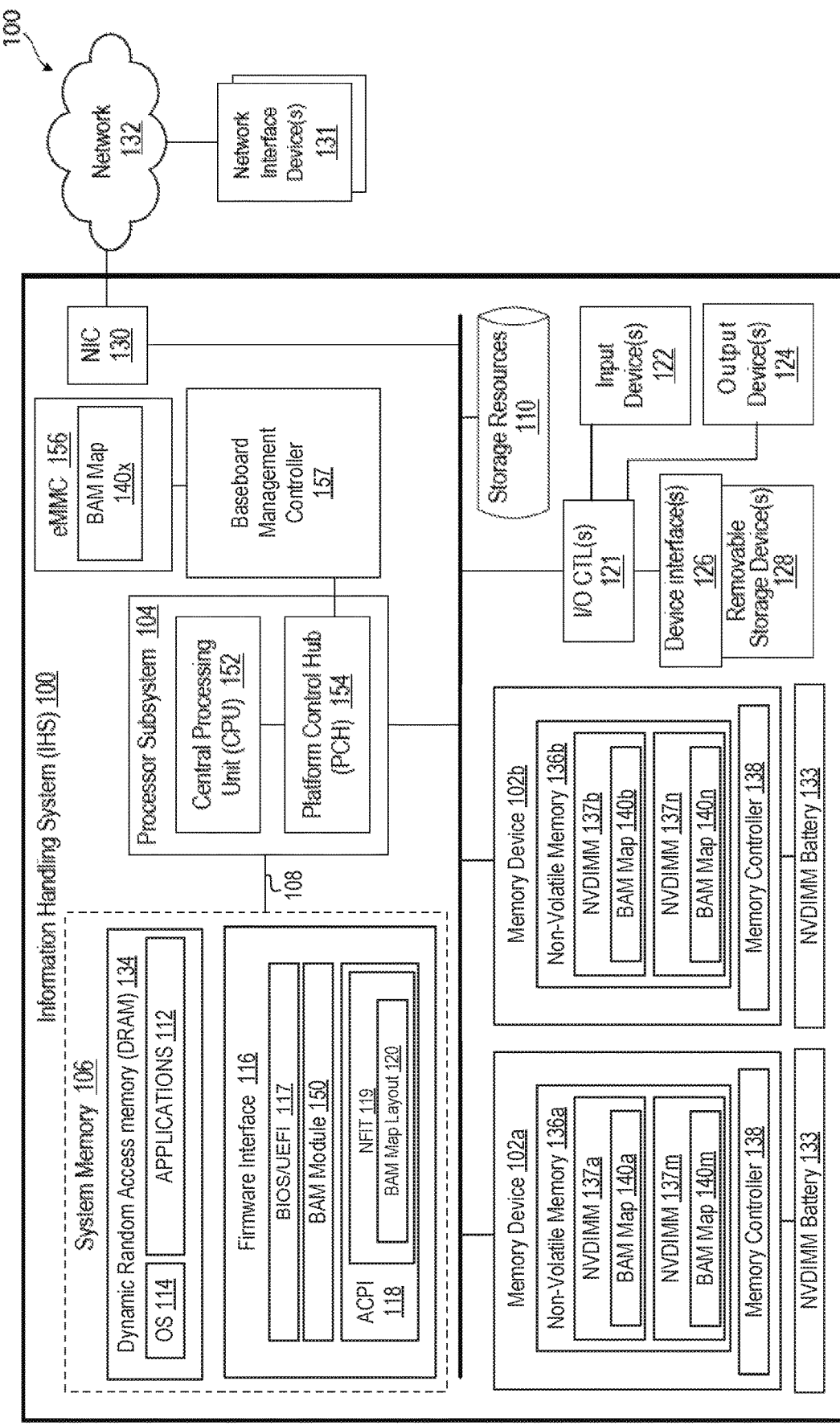
FIG. 1 illustrates a block diagram representation of an example information handling system (IHS) that supports storing updated namespace meta-data for persistent memory devices during a hardware fault, according to one or more embodiments.

Disclosed are a method and an information handling system for tracking, synchronizing, and recovering meta-data changes associated with a persistent memory device of an information handling system (IHS) that occur in the event of a hardware fault. In accordance with embodiments of the present disclosure, an IHS includes a plurality of persistent memory devices coupled to the processor. A firmware interface chipset is coupled to the processor and comprises a firmware interface that is executed by the processor to cause the processor to generate a first indexing map to track memory space attributes associated with a persistent memory device. The memory space attributes point to meta-data stored on at least one persistent memory device from among a plurality of persistent memory devices. The processor generates at least one subsequent indexing map that is a duplicate of the first indexing map. Further, the processor communicatively links the first indexing map to the subsequent indexing map. The processor distributes the subsequent indexing map to one or more mapping memory devices. In response to detection of an update to meta-data associated with the memory space attributes during the event of a hardware fault, the processor identifies one of the (i) first indexing map and (ii) the subsequent indexing map that is stored on the mapping memory device as a writeable indexing map. In response to detection of the hardware fault, the processor writes information defining memory space attributes to at least one of the first indexing map and the subsequent indexing map to generate a master indexing map. The processor synchronizes, via a runtime operation, the master indexing map with each of the first indexing map and the subsequent indexing map to coordinate changes to the memory space attributes.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example IHS 100 that supports storing updated namespace meta-data for persistent memory devices during a hardware fault, according to one or more embodiments. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a personal digital assistant, a consumer electronic device, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, IHS 100 includes processor subsystem 104, which is coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. System interconnect 108 communicatively couples various system components.

One or more software and/or firmware modules can be stored in system memory 106. In one embodiment, system memory 106 can include therein a plurality of such modules, including one or more of application(s) 112 and operating system (OS) 114. System memory 106 may also include firmware interface 116 that includes basic input/output system (BIOS) or Uniform Extensible Firmware Interface (UEFI) 117. The software and/or firmware modules provided by firmware interface 116 have varying functionality when their corresponding program code is executed by processor subsystem 104 or secondary processing devices within management IHS 100. Firmware interface 116 also includes boot assist meta-data (BAM) module 150. BAM module 150, which operates as an extension of firmware associated with firmware interface 116, generates BAM map layout 120 during system boot time. BAM map layout 120 is a system of maps utilized for dynamically indexing meta-data during hardware faults associated with IHS 100. Application(s) 112 may include a word processing application, a presentation application, and a management station application, among other applications. The various software and/or firmware modules have varying functionality when their corresponding program code is executed by processor subsystem 104 or other processing devices within IHS 100.

IHS 100 also includes local storage resources 110. Local storage resources 110 can be, for example, solid-state drives (SSDs) and/or hard disk drives (HDDs). One or more software and/or firmware modules can be stored within SDDs and HDDs, and one or more sets of data can be utilized during management operations of/for IHS 100.

IHS 100 also includes one or more memory devices 102a and 102b coupled to a processing subsystem, or "processor", 104. Select memory regions of memory devices 102a and 102b can be configured as persistent memory. Memory devices 102a and 102b are each connected to a battery source, for example, non-volatile dual in-line memory module (NVDIMM) battery 133. In one embodiment memory devices 102a and 102b share memory controller 138. In an alternate embodiment, memory devices 102a and 102b are connected to separate memory controllers. Although one memory controller 138 is shown, IHS 100 can include more than one memory controller device. Memory device 102a and 102b respectively include non-volatile memory 136a and 136b. Non-volatile memory 136a includes NVDIMM 137a and 137m, as well as a copy of a boot-assist meta-data (BAM) map for each NVDIMM, represented as BAM map 140a and 140m. Non-volatile memory 136b includes NVDIMM 137b and 137n and a copy of a BAM map for each NVDIMM, represented as BAM map 140b and 140n. IHS 100 can automatically update memory devices 102a and 102b with a locally-accessible copy of an firmware image associated with firmware interface 116. Thereby memory devices 102a and 102b can operate using the same version of the firmware image.

In one embodiment, BAM module 150 is a separate software utility that is stored in association with firmware interface 116. During boot-up or booting operations of IHS 100, processor subsystem 104 selectively loads BAM module 150 to system memory 106. BAM module 150 provides the additional functionality that generates BAM maps (140a-n and 140x) associated with BAM map layout 120. Each of BAM maps 140a-n and 140x are stored on a persistent memory storage device. BAM map layout 120 is the map that is updated/written to during a hardware fault. Further, BAM map layout 120 can be located on any one of the persistent memory storage devices. In one embodiment, a hardware fault triggers processor subsystem 104 to execute BAM module 150. Consequently, BAM module 150 updates metadata associated with at least one of the BAM maps (140a-n and 140x). Additional aspects of BAM module 150 and functionality associated thereof, are presented within the description of FIGS. 2-6.

Firmware interface chipset 116 includes BIOS/UEFI 117, which is also referenced as UEFI 117 herein, and a platform firmware such as advanced configuration and power interface (ACPI) 118. UEFI 117 is non-volatile firmware used to perform hardware initialization during the booting process (power-on startup), and to provide runtime services for OS 114. UEFI drivers (117) load BAM map layout 120 into NVDIMM firmware interface table (NFIT) 119, which is accessible by ACPI 118. Any changes to the state of NVDIMM 137a-n at runtime or information regarding dynamically added NVDIMMs are communicated to NFIT 119. NFIT 119 consists of a number of structures that (i) describe the system physical address ranges occupied by NVDIMMs and the types of the regions, (ii) describe the physical location of the memory device, (iii) describe the virtual location of the memory device, and (iv) describes how the memory devices are interrelated.

IHS 100 further includes one or more input/output (I/O) controllers 121 that support connection by and processing of signals from one or more connected input device/s 122, such as a keyboard, mouse, touch screen, or microphone. I/O controllers 121 also support connection to and forwarding of output signals to one or more connected output devices 124, such as a monitor or display device or audio speaker(s). Additionally, in one or more embodiments, one or more device interfaces 126, such as an optical reader, a Universal Serial Bus (USB), a card reader, Personal Computer Memory Card International Association (PCMCIA) slot, and/or a high-definition multimedia interface (HDMI), can be associated with IHS 100. Device interface(s) 126 can be utilized to enable data to be read from or stored to corresponding removable storage device/s 128, such as a compact disk (CD), digital video disk (DVD), flash drive, or flash memory card. In one or more embodiments, device interface(s) 126 can further include general purpose I/O interfaces such as inter-integrated circuit ($I^2C$), system management bus (SMB), and peripheral component interconnect (PCI) buses.

IHS 100 comprises network interface controller (NIC) 130. NIC 130 enables IHS 100 and/or components within IHS 100 to communicate and/or interface with other devices, services, and components that are located external to IHS 100. The devices, services, and components that are located external to IHS 100 are represented as network devices 131. These devices, services, and components can interface with IHS 100 via an external network, such as example network 132, using one or more communication protocols that include transport control protocol (TCP/IP) and network block device (NBD) protocol. Network devices 131 can be, for example, a server or group of servers that share a distributed namespace with a memory device of IHS 100. Network 132 can be a local area network, wide area network, personal area network, and the like, and the connection to and/or between network and IHS 100 can be wired, wireless, or a combination thereof. For purposes of discussion, network 132 is indicated as a single collective component for simplicity. However, it should be appreciated that network 132 can comprise one or more direct connections to other devices as well as a more complex set of interconnections as can exist within a local area network or a wide area network, such as the Internet.

IHS 100 further includes baseboard management controller (BMC)/service processor, BMC 157, which is communicatively coupled to processor 104. BMC 157 is a service processor that is capable of monitoring the physical state of servers, computers, or other hardware devices with the help of sensors. BMC 157 is embedded within the main circuit board or motherboard of IHS 100. BMC 157 helps to monitor additional servers and/or devices remotely associated with IHS 100. BMC 157 also manages and/or monitors one or more virtual machine(s) associated with IHS 100. The virtual machine runs a separate operating system and applications but is backed by the physical resources of the host system, IHS 100. In one embodiment, a portion of NVDIMM 137a is configured to be dedicated to one or more virtual machines associated with IHS 100. BMC 157 also communicatively connects to embedded multimedia card (eMMC) 156, which includes BAM map 140x. In one embodiment, eMMC 156 consist of both flash memory and a flash memory controller integrated on the same silicon die, and therefore does not need power to retain data.

Processor subsystem 104 can include a central processing unit (CPU) 152 that is augmented by a platform control hub (PCH) 154. The PCH 154 interfaces to functional components of the IHS 100 such as a baseboard management controller (BMC)/service processor 157. Out-of-band communication for the IHS 100 can be performed by the BMC/service processor 157. The out-of-band communication is performed via NIC 130 and network 132. Network 132 connects to other devices that are remote to IHS, for example network device(s) 131, which may be a management console. BMC 157 can have access to BAM map 140x in eMMC 156. In one embodiment, eMMC 156 is a flash memory and controller packaged into a small ball grid array (BGA) integrated circuit (IC) package for use in circuit boards as an embedded non-volatile memory system.

Figure 2:
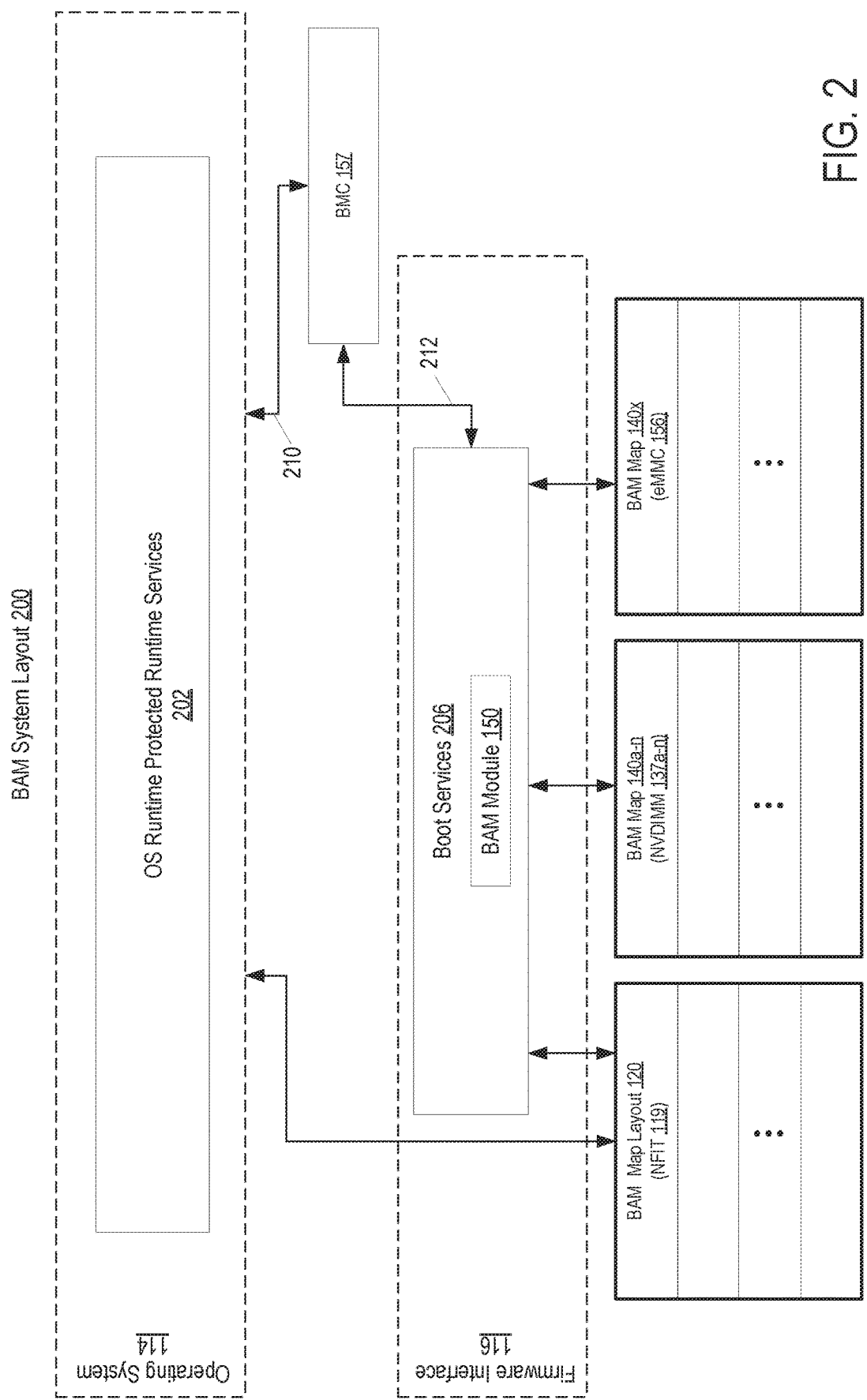
FIG. 2 illustrates a block diagram representation of a boot assist meta-data system used for storing updated namespace meta-data during a hardware fault, according to one or more embodiments.

FIG. 2 illustrates a block diagram representation of a BAM system layout 200 used for storing updated namespace meta-data during a hardware fault, according to one or more embodiments. As illustrated, BAM system layout 200 includes OS 114, firmware interface 116, BAM map layout 120, BAM map 140a-n, and BAM map 140x. OS 114 includes operating system runtime protected runtime service 202. Firmware interface 116 includes BAM module 150. BAM module 150, being executed by processor 104 during the operations of OS 114, communicates with BMC 157, NFIT 119, NVDIMM 137a-n, and eMMC 156. OS 114 communicates with BMC 157 via operating system—baseboard management controller (OS-BMC) communication channel 210. OS-BMC communication channel 210 can be, for example, a peripheral component interconnect express (PCIe) bus, inter-integrated circuit (I²C) bus, or a USB-NIC interface bus. BMC 157 communicates with BAM module 150 during system boot via host-BMC communication channel 212. Host-BMC communication channel 212 can be, for example, a peripheral component interconnect express-vender defined message (PCIe-VDM) bus, I²C bus, or a USB-NIC interface bus. Additionally, firmware interface includes runtime services 202. During execution of boot services 206 BAM module 150 generates and/or links to BAM layout 120 in NFIT 119, BAM map 140a-n in NVDIMM 137a-n, and BAM map 140x in eMMC 156.

NFIT 119 is specified by ACPI 118 and built by UEFI drivers to describe and track information associated with NVDIMMs 137a-n. This information includes, but is not limited to including, NVDIMM 137a-n interleave information and information related to how the NVDIMMs 137a-n are mapped into the physical address space of IHS 100. NFIT 119 enumerates persistent memory ranges, memory-mapped-I/O apertures, physical memory devices such as NVDIMMs 137a-n, and the associated properties of the NVDIMMs 137a-n.

In general, enumeration takes place by locating all NVDIMMs and organizing the NVDIMMs by range and type, associated memory device, as well as associated memory controller. IHS 100 may include and/or communicate with a plurality of NVDIMMs, both physical and virtual. In the example of BAM system layout 200, NVDIMMs 137a-n are depicted; however, fewer or additional physical and/or virtual NVDIMMS may be added in other implementations. NFIT 119 is the primary means by which UEFI 117, which is NVDIMM-aware, describes the physical hardware topology of IHS 100. This description includes the number of memory areas (i.e. nodes), the number of slots for memory devices per memory area (i.e. slots per node), the memory controllers per slot, and the topology of NVDIMMs (e.g. NVDIMM 137a and 137b). The topology of the NVDIMMs may include interleave information (provided by NFIT 119), DIMM physical address (DPA), how NVDIMMS 137a and 137b map to the system physical address (SPA) space, block window command, status, and aperture register definitions, and the unique NFIT device handle utilized with NVDIMM device specific method (DSM) commands.

In operation, processor 104 executes runtime services 202. During boot of IHS 100, system resources are owned by firmware interface 116 and are controller by a variety of system services that can expose BAM module 150 for use to generate and manage BAM map layout 120 and BAM maps 140a-n and 140x. Two of the system services initiated by firmware interface 116 are OS runtime protected runtime services 202 and boot services 206. OS runtime protected runtime services 202 include functions that are available both during the boot phase prior to the launching of OS 114 and subsequent to OS 114 executing. Boot services 206 include functions that are available prior to launching OS 114, and prior to the calling of the function to exit boot services. OS runtime protected runtime services 202 and boot services 206 are available during the early launch of the UEFI 117. UEFI drivers load BAM map layout 120 into NFIT 119. BAM module 150 generates a plurality of indexing maps. BAM module 150 generates a first indexing map, BAM map layout 120. Additionally, BAM module 150 also generates subsequent indexing maps, BAM maps 140a-n and BAM map 140x. BAM map layout 120 is a master map, and each of BAM maps 140a, 140b, and 140d is a duplicate of the first indexing map. NFIT 119 dynamically handles write enabled meta-data during hardware faults. BAM map layout 120 accepts delta meta-data updates of all namespaces across all NVDIMM's 137a-n associated with the IHS 100 during the hardware fault/failure. "Delta", herein, refers to the specific changes associated with the meta-data during the hardware fault. Based on the topology of boot assist meta-data system layout 200, BAM map layout 120 is communicatively linked to the subsequent indexing maps (140a-n and 140x). OS runtime protected runtime services 202 continue to be available after firmware interface 116 has relinquished control to a loading agent for OS 114. Therefore, OS runtime protected runtime services 202 can be used to communicate with BMC 157 via OS-BMC communication channel 210. OS runtime protected runtime services 202 enables BAM module to synchronize boot assist meta-data across NFIT 119, NVDIMM 137a-n, and eMMC 156 where duplicate copies of BAM indexing maps (140a-n and 140x) are maintained. Advantageously, during boot/reboot of IHS 100, BAM module 150 enables NFIT 119 to communicatively synchronize the delta updates of all namespaces associated with each of NVDIMMs 137a-n to the BAM maps 140a-n and x. BAM maps 140a-n, and x are respectively associated with NVDIMM 137a-n and eMMC 156. BAM module 150 thereby enables restoration of the delta meta-data back to the corresponding NVDIMM namespace according to the synchronized BAM maps 140a-n and x.

In one embodiment, BAM module 150 enables OS 114, as well as a virtual machine associated with IHS 100, to mount the namespaces associated with NVDIMM 137a-n and/or an associated virtual NVDIMM, even when the NVDIMMs are exposed as read only. When BAM module 150 is executed, BAM map layout 120 is generated as an entry in NFIT 119 and is enumerated during boot time for successful probing, in part or in full, of memory regions associated with NVDIMMs 137a-n. BAM map layout 120 holds all of the delta meta-data updates made to the particular namespace attributes in NFIT 119. The same delta meta-data updates are synced back to the original namespace meta-data using protected OS runtime protected runtime service 202 when NVDIMMs 137a-n, and/or a virtual counterpart, become available in write mode. BAM module 150 supports uninterrupted mounting across each type of namespace. For example, types of namespaces include block translation table (BTT) block mode, block namespaces, persistent memory namespaces, and/or memory region spread across multiple virtual NVDIMMs.

The use of BAM module 150 to generate a plurality of BAM indexing maps which are strategically distributed to multiple memory locations associated with IHS 100 has a number of advantages. Persistent memory provisioning for mounting namespaces in a memory region of NVDIMMs 137a-n in read/write mode is based, in part, on an NVDIMM battery status and the deterioration of flash memory. Typically, during battery failure of NVDIMMs 137a-n or during the deterioration of NVDIMMs 137a-n, NVDIMM drivers identify the affected memory region and puts all of the affected regions in a read only mode. The read only mode means that no writes for OS drivers is allowed for the target NVDIMM memory regions. However, with the execution of BAM module 150, a plurality of BAM maps is generated, for tracking changes associated with NVDIMMs 137a-n during the hardware fault. The change/modification to the memory space is updated on at least one BAM map associated with a writeable device. Each of the subsequent indexing maps, for example, BAM maps 140a-n, and 140x that are stored on other storage devices are synchronized with the BAM master map, which is the BAM map that received the update/changes. The synchronization of subsequent indexing maps to the BAM master map is performed during boot services 206, enabling the meta-data to be tracked and utilized once IHS 100 recovers from the hardware fault and/or failure.

Figure 3:
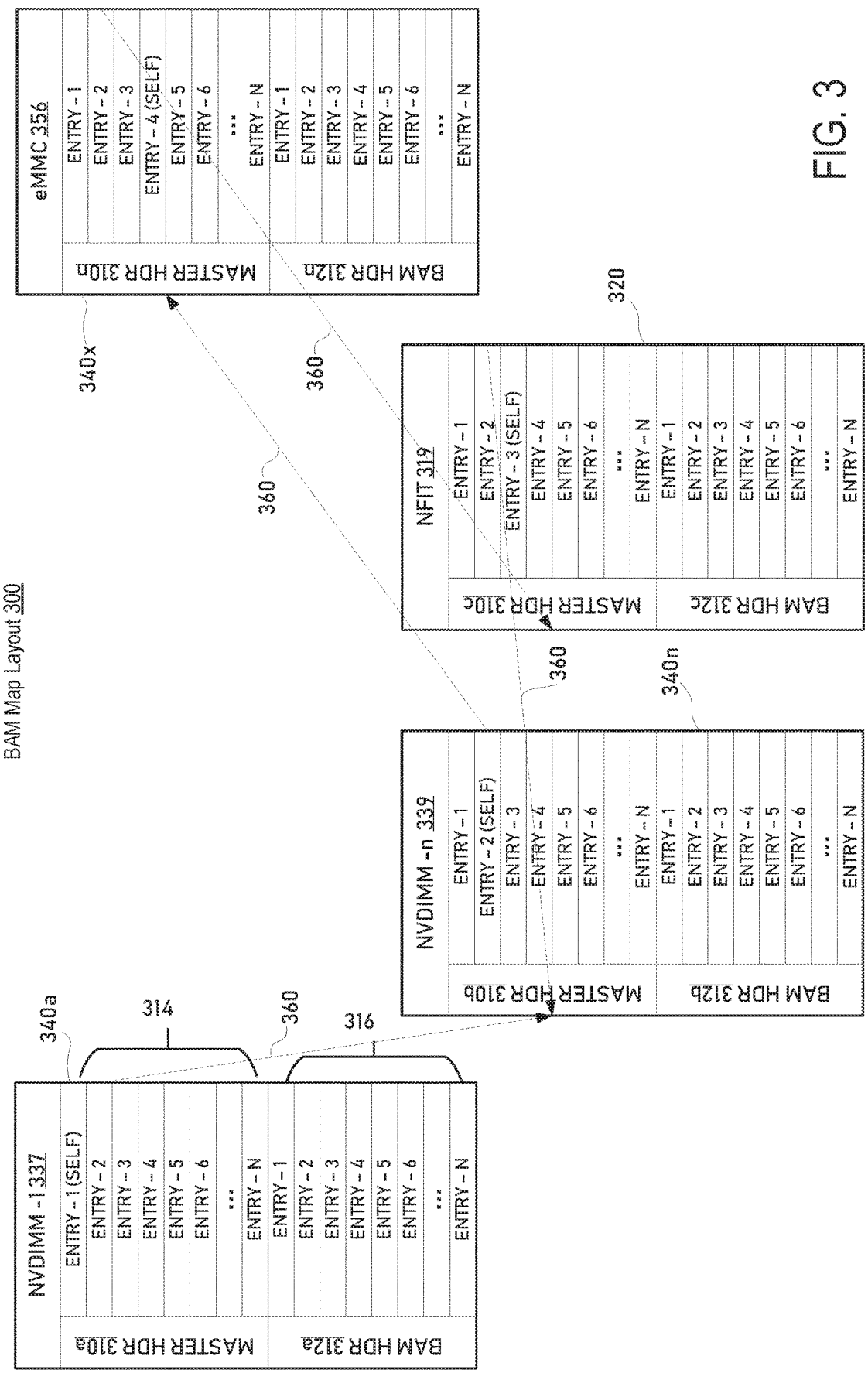
FIG. 3 illustrates a boot assist meta-data map layout for indexing updated namespace meta-data, according to one or more embodiments.

FIG. 3 illustrates a BAM map layout 300 for indexing updated namespace meta-data, according to one or more embodiments. Boot assist meta-data map layout 300 includes NFIT 319 having BAM map layout 319, NVDIMM-1 337, NVDIMM-n 339, and eMMC 356, each of which has respective BAM map 340a, and 340n, and 340x stored thereon. As illustrated, NFIT 319 includes BAM map layout 320. Each map includes a master header and a BAM header. For example, BAM map 340a includes master header 310a, BAM map 340x includes master header 310b, BAM map layout 120 includes master header 310c, and BAM map 340y includes master header 310n. Additionally, BAM map 340a includes BAM header 312a, BAM map 340x includes BAM header 312b, BAM map layout 320 includes BAM header 312c, and BAM map 340y includes BAM header 312n. Further, each of the master headers and BAM headers respectively include master entries 314 and BAM entries 316, which may be, for instance a namespace or namespace meta-data.

In one embodiment, each of master headers 310a-n is used to locate all other master headers, which can be spread across NFIT 319, NVDIMM-1 337, and eMMC 356. Master header 310a-n identifies the size, type, number of entries, and/or other characteristics that are associated with master map 319 and BAM maps 340a-n and x. Each master entry 314 in the master header points to other master headers stored in other places in IHS 100. BAM header 312a-n is utilized to describe the size, type, and number of BAM entries 316. Each BAM entry 316 points to a namespace associated with at least one of the plurality of NVDIMMs (137a-n) that are associated with IHS 100. Boot assist meta-data map layout 300 illustrates the master header architecture using reflex mapping. In reflex mapping, the target entry points to itself and other copies of itself in other storages. For example, during a hardware fault entry-2 of BAM map layout 320 receives updated meta-data. Pointer 360 depicts the link between each entry-2. During the next boot, pointer 360 identifies entry-2 within NVDIMM-1 337, NVDIMM-n 339, and eMMC 356 as namespaces to received updated meta-data for BAM map layout 320, BAM maps 340a, 340n, and 340x.

In general, each NVDIMM namespace is described by a set of namespace labels that reside on each NVDIMM contributing to the namespace in a reserved area called the namespace label data area. A namespace is a set of symbols that are used to organize objects of various kinds, so that these objects may be referred to by name. In one embodiment, the namespaces are utilized for the purpose of grouping symbols and identifiers around a particular functionality and to avoid naming confusion between multiple identifiers that share the same name. The NVDIMM driver is responsible for maintaining the namespace labels that describes the namespaces. NFIT 319 may retrieve the namespace information for indexing from a respective driver. Since each NVDIMM can contain multiple labels, each NVDIMM can therefore contain multiple namespaces. The labels describe the DIMM physical address (DPA) and range of that portion of the namespace on that given NVDIMM. BAM entries 316 are spread across multiple NVDIMMs (NVDIMM-1 339-NVDIMM-n 339). Further, the architecture of the BAM entries is indexed in NFIT 119 and replicated in eMMC 356.

In one embodiment, IHS 100 experiences a hardware fault. For example, UEFI drivers senses an NVDIMM battery (133) or supercapacitor fail or weak state, thereby forcing at least one NVDIMM, e.g., NVDIMM-1 337, into a read only mode. NVDIMM-1 337 is associated with OS 114 (or similar operating entity) as read only. Therefore, BAM module 150 redirects OS 114 to mount a BAM map stored in a next NVDIMM-n (339) which is exposed as a read/write mode. OS 114 mounts the namespace associated with NVDIMM 137b by performing changes to namespace attributes/meta-data. Utilizing the reflex mapping of BAM map layout 300, OS 114 is able to locate and access a read/write component that can support mounting of the desired namespaces to OS 114. During protected runtime services, the read only components are synchronized with the modified BAM map to reflect the updated BAM.

Figure 4:
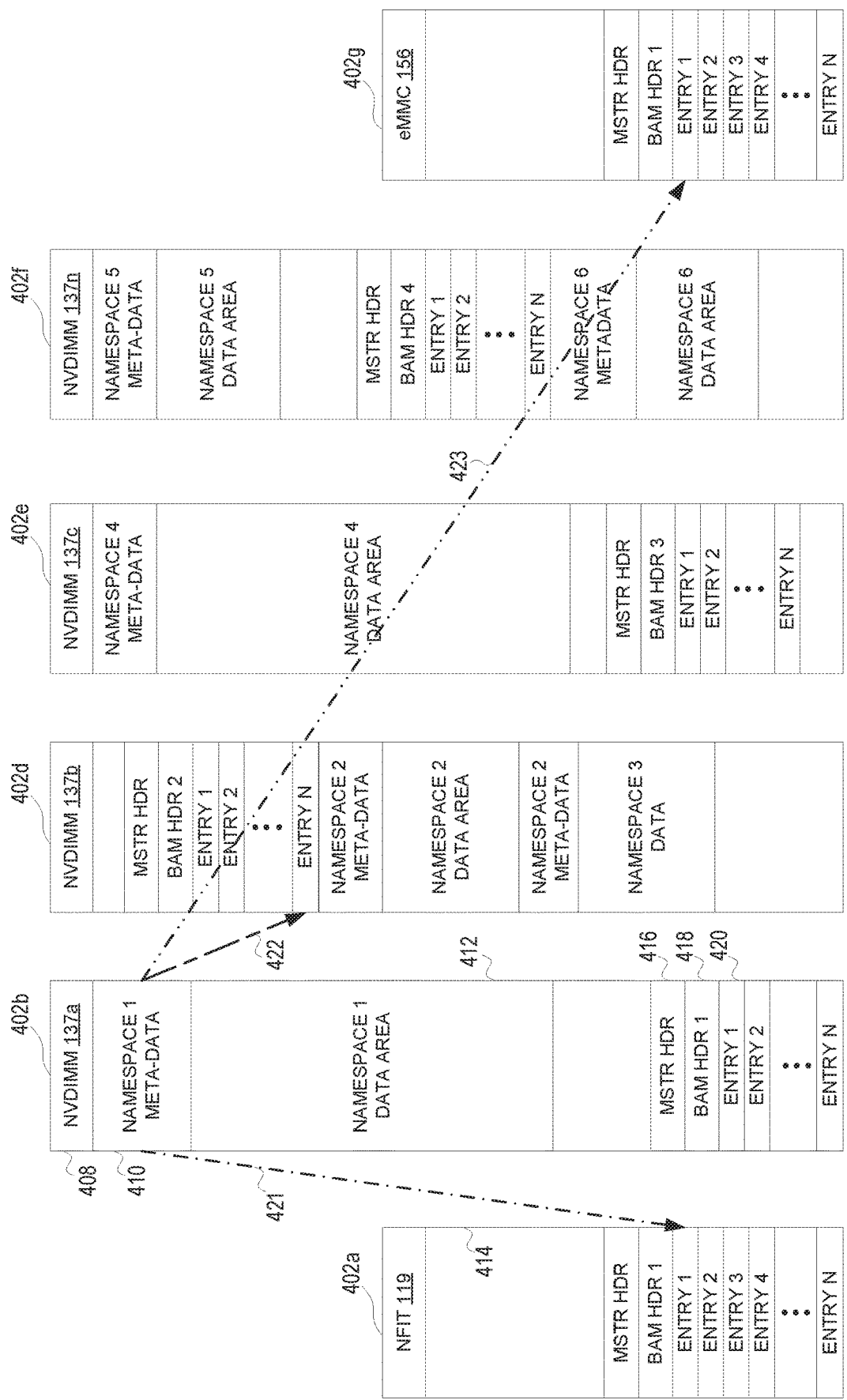
FIG. 4 illustrates a boot assist meta-data indexing map memory interface for indexing updated namespaces across multiple memory devices, according to one or more embodiments.

FIG. 4 illustrates a BAM indexing map memory interface 400 for indexing updated namespaces across multiple memory devices, according to one or more embodiments. BAM indexing map memory interface 400 includes BAM master map 402a and a plurality of BAM maps 402b-g. BAM master map 402a is generated during boot time, and is loaded into NFIT 119 by UEFI (NVDIMM) drivers. Replica maps of BAM master map 402a, i.e., BAM maps 402b-g, are respectively associated with NVDIMM 137a-n and eMMC 156. Each of BAM master map 402a and BAM maps 402b-g includes a device label 408, namespace label 410, namespace entry 412, master header entry 416, BAM header entry 418, and memory attributes entry 420. Device label 408 identifies the storage location. Namespace label 410 identifies the specific namespace identification and namespace entry 412 identifies an area entering data associated with namespace label 410. Some BAM maps also include an open space entry 414 for future modifications/updated entries. BAM indexing map memory interface 400 additionally includes pointer 422. Pointer 422 is utilized to point to the location of a desired namespace and/or meta-data entry and copies of the same entry on an alternate storage device(s).

In one embodiment, OS 114, or similarly, a virtual machine (VM) that is associated with IHS 100, detects an update to meta-data during a hardware fault. BAM module 150 enables processor 104 to identify which map within BAM indexing map memory interface 400 is associated with a writeable storage device. In response to processor 104 detecting a writeable storage device, the BAM map associated with the storage device is updated to reflect changes to the meta-data. At runtime (during OS runtime protected runtime services 202), BAM maps assigned to other storage devices are synchronized to reflect the updated changes. Thereby, changes to the memory space attributes across each of BAM master map 402a and BAM maps 402b-g are coordinated once the other storage devices are available for execution of a write operation during reboot.

BAM module 150 advantageously enables namespaces for multiple persistent memory devices to be managed and updated even when changes are made during and/or subsequent to a hardware fault. During hardware faults some NVDIMMs are read-only, therefore no BTT access/operations can be executed. Further, no writes are allowed to the NVDIMM, and namespace meta-data updates are not allowed. However, executing BAM module 150 enables the execution of writes by OS 114 (or a VM). Utilizing BAM indexing map memory interface 400, processor 104 can identify a writeable storage device because pointer 422 can point to the desired entry on a writeable device. OS 114 (or VM) updates the entry. During protected runtime services NFIT 119 can identify the structure of the BAM maps and the location of the indexed entries across all BAM maps. During the hardware fault, namespace and/or meta-data entry changes may be made to an individual NVDIMM or across multiple NVDIMMs. BAM module 150 enables the synchronization of delta meta-data made by OS 114 (or VM) to namespace/meta-data entries on a particular NVDIMM or across multiple NVDIMMs, once the NVDIMM is available for write operations or during the reboot. The ability to update multiple persistent storage devices during and/or subsequent to a hardware fault will avoid BTT mount failures, as well as namespaces mounting failures during a crash of the VM.

In one embodiment, BAM indexing map memory interface 400 includes a plurality of pointers. Each pointer selectively connects a BAM header, such as namespace label 410 to a corresponding namespace. For example, pointer 421 associates namespace label 1 meta-data stored in NVDIMM 137a to the corresponding entry in NFIT 119. Likewise, pointer 422 and pointer 423 identify the corresponding entry namespace entry in NVDIMM 137b and NVDIMM 137n. Each pointer (421, 422, 423) identifies a corresponding copy of the BAM at another namespace. Therefore, in response to detection of a corrupted namespace meta-data in one storage region, an uncorrupted copy of the namespace meta-data can be retrieved and utilized from another storage device and/or storage region.

Figure 5:
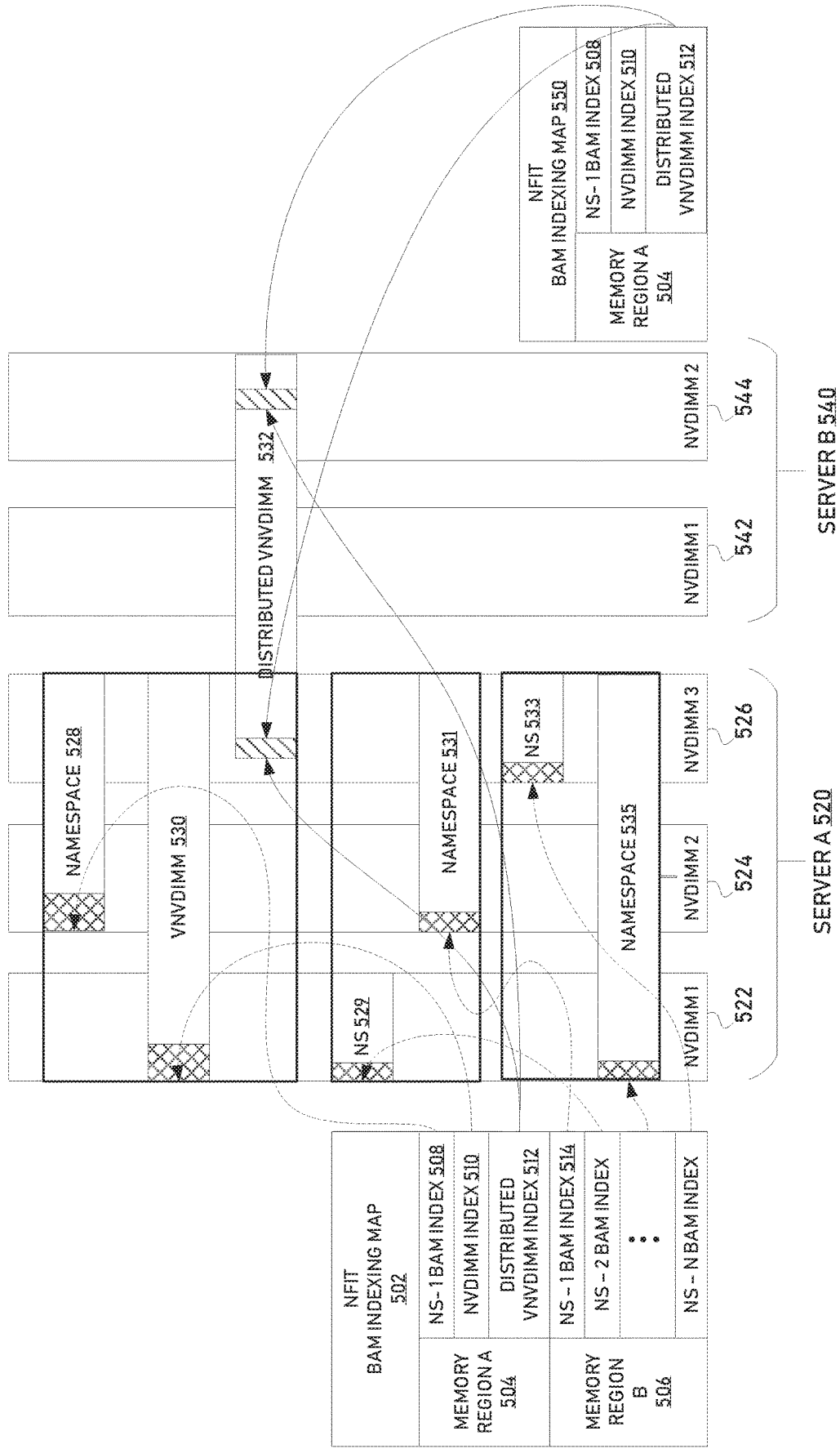
FIG. 5 illustrates a boot assist meta-data map indexing map server interface for indexing updated virtual memory namespaces across multiple memory devices and multiple servers, according to one or more embodiments.

FIG. 5 illustrates a BAM indexing map server interface 500 for indexing updated virtual memory namespaces across multiple memory devices and multiple servers, according to one or more embodiments. The example of BAM indexing map server interface 500 includes NFIT BAM indexing map 502, server A 520, server B 540, and NFIT BAM indexing map 550. NFIT BAM indexing map 502 includes a master header and BAM header, respectively stored in memory region A 504 and in memory region B 506, which each have a plurality of entry areas for pointing to memory space regions associated with indexed memory regions. For example, memory region A 504 includes NS-1 BAM index 508, NVDIMM index 510, and distributed virtual non-volatile DIMM (NVDIMM) index 512. Memory region B 506 includes a plurality of entry areas, for example namespace-1 (NS-1) BAM index 514. At least one memory region indexed by NFIT BAM indexing map 502 is also indexed in NFIT BAM indexing map 550. For example, NFIT BAM indexing map 550 includes a master header, memory region A 504. Memory region A 504 includes NS-1 BAM index 508, NVDIMM index 510, and distributed VNVDIMM index 512.

Each server (520 and 540) depicted in BAM indexing map server interface 500 include a plurality of non-volatile memory devices. For example, server A 520 includes NVDIMM-1 522, NVDIMM-2 524, and NVDIMM-3 526. There is a plurality of namespace regions spread across the memory devices of server A 520. The plurality of namespace regions is represented as namespace 528, 529, 531, 533, and 535. Additionally, server A 520 includes a virtual memory region, VNDIMM 530 that is distributed across each of the NVDIMMs (522, 524, 526). Server B 540 includes an example distributed virtual memory region illustrated as distributed VNVDIMM 532. Distributed VNVDIMM 532 is spread across multiple servers (520 and 540) and multiple memory devices (526, 542, and 544).

In one embodiment, at least one namespace of BAM indexing map server interface 500 maps to a plurality of memory regions. The plurality of memory regions is associated with a plurality of corresponding persistent memory devices, such as NVDIMM 522, 524, and 526. Each namespace 528, 529, 531, and 535 associated with the memory regions is indexed to each corresponding memory region on each one of the plurality of corresponding persistent memory devices NVDIMM (522, 524, and 526). Accordingly, namespaces 528, 529, 531, 533, and 535 are indexed on master index map of NFIT BAM indexing map 502 as well as on any replica of the BAM indexing map stored on another memory device.

As per industry standard Joint Electron Device Engineering Council (JEDEC) spec, the namespace information is saved in the NVDIMM controller for asynchronous DRAM refresh (ADR) domain only for a single namespace in the entire NVDIMM. However, if the NVDIMM has multiple namespaces, then the memory attributes which include namespace meta-data is not saved in the NVDIMM controller, especially if the namespace is split across multiple NVDIMMs. Consequently, the namespace information in the NVDIMM controller is not useful to access the namespace which is split across two or more NVDIMMs. BAM module 150 advantageously supports the writing and indexing of namespaces across multiple memory regions even when those regions are spread across multiple NVDIMMs. BAM module 150 enables NFIT BAM indexing map 502 and 550 to be generated and stored on multiple persistent memory components so that during power failures and/or hardware faults the at least one writeable device can continue to track and index changes made to memory using a respective BAM map. Each BAM map across the memory regions is then synchronized, updating the alternate maps of the changes to the namespace meta-data, upon the next reboot of the IHS (100). This process is highly advantageous to an end user of an IHS 100, as execution of BAM module 150 enables an end user to avoid the loss of information shared across multiple memory regions during unexpected hardware faults and power failures.

Further, another advantage of BAM indexing map server interface 500 includes the dynamic indexing and managing of distributed VNVDIMM/namespaces over multiple servers and/or virtual servers. As illustrated in BAM indexing map server interface 500, in one embodiment, distributed VNVDIMM 532 is spread across multiple servers (520 and 540). Generating indexing maps such as NFIT BAM indexing map 502 and 550 enables actual namespace meta-data to be stored and indexed, and during reboot the meta-data changes are synced with actual NVDIMM namespace of all associated NVDIMMs. Syncing the meta-data with all associated NVDIMMs will prevent stop loading of VMs due to a mount failure of the corresponding namespace.

Figure 6:
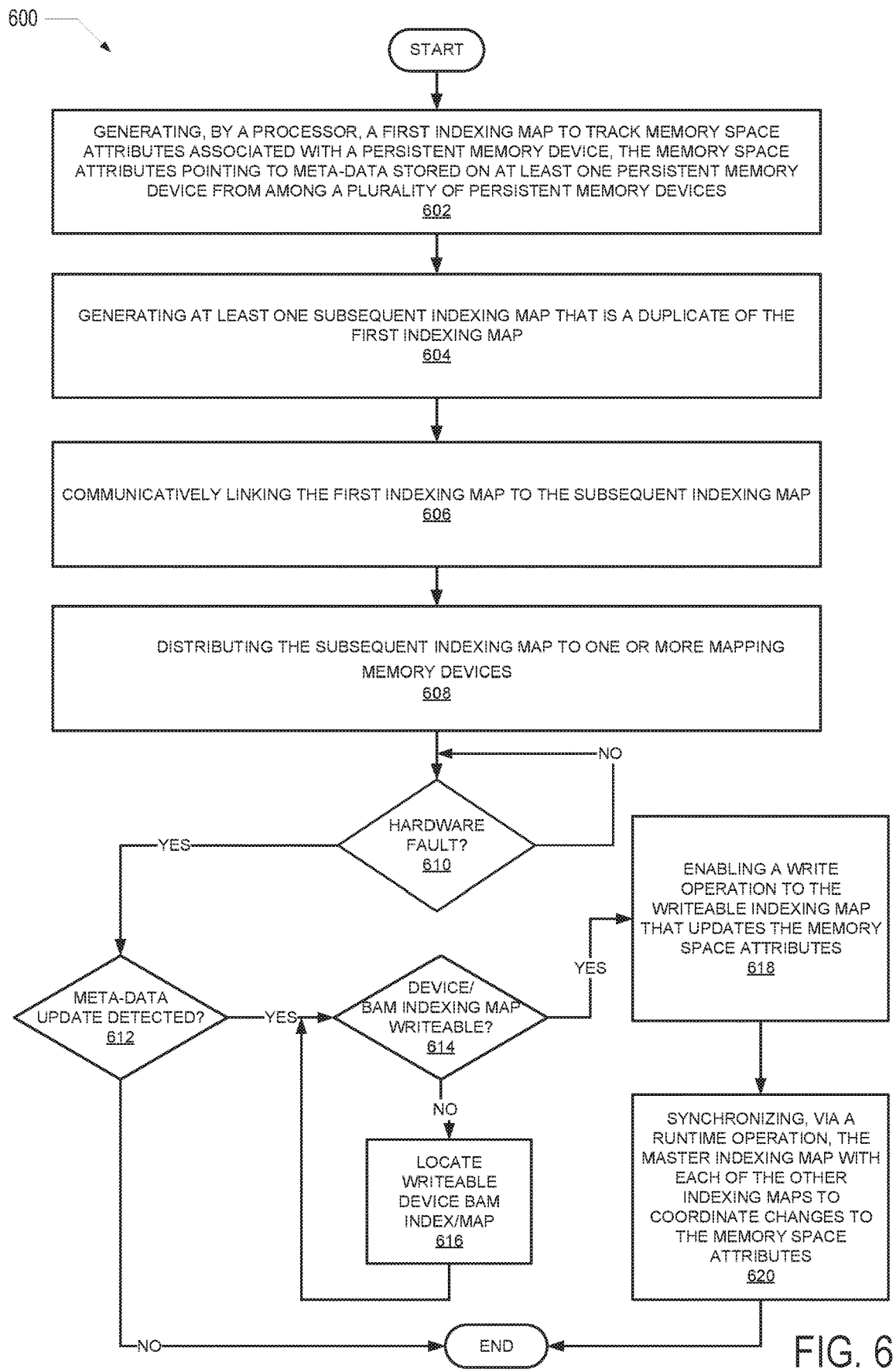
FIG. 6 illustrates a flow chart of a method for writing namespace meta-data that is associated with a persistent memory device to another memory device during a hardware fault, according to one or more embodiments.
Figure 7:
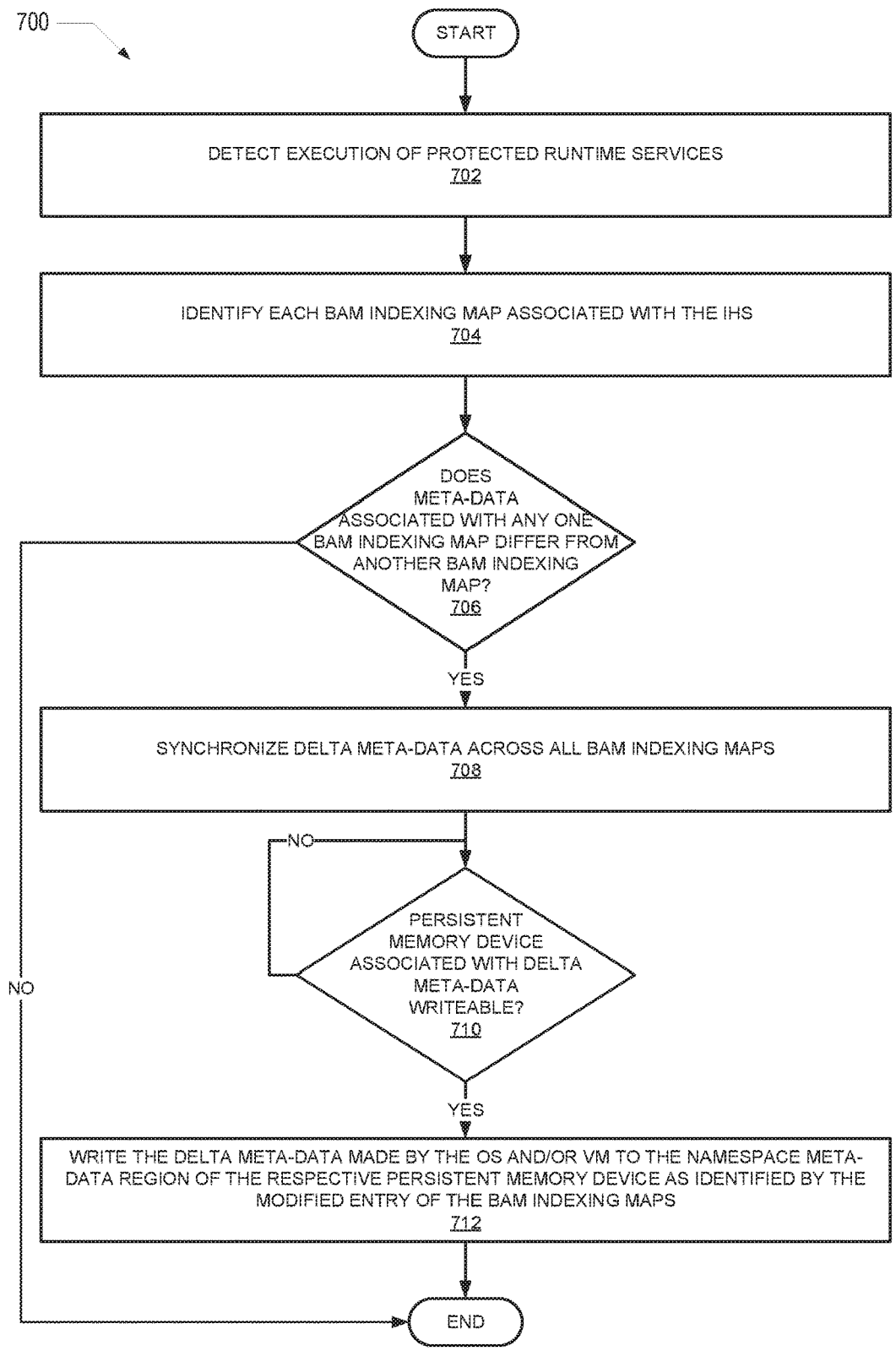
FIG. 7 illustrates a flow chart of a method for writing delta namespace meta-data to a respective persistent memory device during protected runtime services, according to one or more embodiments.

FIGS. 6 and 7 illustrate flowcharts of an exemplary method 600 and 700 by which processor 104 (FIG. 1) performs different aspects of the processes that enable the one or more embodiments of the disclosure. Generally, methods 600 and 700 represent computer-implemented methods. The description of methods 600 and 700 are provided with general reference to the specific components illustrated within FIGS. 1-5.

FIG. 6 illustrates a flow chart of a method 600 for writing namespace meta-data that is associated with a persistent memory device to another memory device during a hardware fault, according to one or more embodiments. Method 600 is performed when BAM module 150 is executed by processor 104, and method 600 is performed, in part, by a firmware interface such as by UEFI during a boot or restart operation. Method 600 begins at the start block and includes generating, by a processor, a first indexing map (502) to track memory space attributes (508, 510, 512) associated with a persistent memory device (522, 524, 526) (block 602). The memory space attributes (508, 510, 512) point to meta-data stored (528) on at least one persistent memory device (524) from among a plurality of persistent memory devices (522, 524, 526). The processor generates at least one subsequent indexing map that is a duplicate of the first indexing map (block 604). Utilizing NVDIMM (UEFI) drivers (117), the processor communicatively links the first indexing map (120) to the subsequent indexing map(s) (137*a-n*, and 140*x*) (block 606). Processor 104 enables distribution of the subsequent indexing map to one or more mapping memory devices (block 608). Processor 104 determines whether a hardware fault is detected (decision block 610). The hardware fault may include, but is not limited to including, a battery power falling below a predetermined threshold, a battery power failure, super capacitor failure, and a persistent memory device failure. In response to no hardware fault being detected, processor 104 proceeds with other operations of IHS 100 while monitoring for the hardware fault. If a hardware fault is detected, processor 104 determines whether meta-data associated with any of the persistent memory devices is updated (decision block 612).

In response to detection of an update to meta-data associated with the memory space attributes of one or more memory devices during a hardware fault, processor 104 identifies a mapping memory device. Processor 104 determines whether the mapping memory device is writeable (decision block 614). In response to the mapping memory device not being writeable, processor 104 locates a memory device having a BAM indexing map that is exposed as read/write mode (block 616). In response to the device being writeable, processor 104 enables a write operation to the writeable indexing map (block 618). This action generates a master map for updating the subsequent maps during the next reboot/runtime operation of IHS 100. Processor 104 enables synchronizing, via a runtime operation, of one of the master indexing map with each of the other indexing maps to coordinate changes to the memory space attributes (block 620). The process concludes at the end block.

FIG. 7 illustrates a flow chart of a method 700 for writing delta namespace meta-data to a respective persistent memory device during protected runtime services, according to one or more embodiments. Method 700 that is performed when BAM module 150 is executed by processor 104, and method 700 is performed, in part, by a firmware interface such as by UEFI during a boot or restart operation. Method 700 begins at the start block and includes detecting, by processor 104, execution of protected runtime services (block 702). The processor identifies each BAM indexing map associated with IHS 100 (block 704). The indexing maps are listed by NFIT 119. Processor 104 determines whether meta-data associated with any one BAM indexing map differs from another BAM indexing map (decision block 706). In response to the meta-data associated with any one BAM indexing map differing from another BAM indexing map, BAM module 150 enables processor 104 to synchronize delta meta-data across all BAM indexing maps (block 708). In response to the meta-data associated with any one BAM indexing map not differing from another BAM indexing map, the method ends.

Processor 104 determines whether the persistent memory device associated with delta meta-data is writeable (decision block 710). In response to the persistent memory device associated with delta meta-data being writeable, processor 104 writes the delta meta-data to the namespace meta-data region of the corresponding persistent memory device (block 712). The namespace meta-data region on the corresponding persistent memory device is identified by the BAM indexing maps. In response to the persistent memory device associated with delta meta-data not being writeable, processor 104 waits until the persistent memory device is writeable. The process concludes at the end block.

In the above described flow charts of FIGS. 6 and 7, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for enabling a write operation to track meta-data changes during a hardware fault in an information handling system (IHS), the method comprising:
    generating, by a processor, a first indexing map to track memory space attributes associated with a persistent memory device, the memory space attributes pointing to meta-data stored on at least one persistent memory device from among a plurality of persistent memory devices;
    generating at least one subsequent indexing map that is a duplicate of the first indexing map;
    communicatively linking the first indexing map to the subsequent indexing map;
    distributing the subsequent indexing map to one or more mapping memory devices;
    in response to detection of an update to meta-data associated with the memory space attributes in an event of a hardware fault, identifying one of the (i) first indexing map and (ii) the subsequent indexing map that is stored on the mapping memory device as a writeable indexing map, wherein the writeable indexing map is on a writeable memory device;
    in response to detection of the hardware fault writing information defining memory space attributes to at least one of the first indexing map and the subsequent indexing map to generate a master indexing map; and
    synchronizing, via a runtime operation, the master indexing map to each of the first indexing map and the subsequent indexing map to coordinate changes to the memory space attributes.

2. The method of claim 1, wherein the information defining memory space attributes correspond to one or more of a namespace and a portion of a namespace associated with a respective persistent memory device.

3. The method of claim 1, further comprising executing the write operation to one of the first indexing map and subsequent indexing map during the hardware fault, when a corresponding one of the first indexing map and the subsequent indexing map is stored on a mapping memory device that is writeable during detection of the hardware fault.

4. The method of claim 3, further comprising identifying the mapping memory device that is writeable from among plurality of mapping memory devices, in response to a selected mapping memory device being unable to receive the write operation.

5. The method of claim 3, wherein the hardware fault comprises one or more of a battery power falling below a predetermined threshold, a battery power failure, and a persistent memory device failure.

6. The method of claim 1, wherein at least one of the plurality of persistent memory devices is a non-volatile dual in-line memory module (NVDIMM), and a NVDIMM driver loads the first indexing map to a NVDIMM firmware interface table (NFIT) stored on a first memory device from among the one or more mapping memory devices.

7. The method of claim 6, wherein the one or more mapping memory devices are associated with at least one of a NVDIMM controller, baseboard management controller (BMC), and an embedded multi-media controller (eMMC), and wherein a respective controller loads one of the first indexing map and the subsequent indexing map to an associated mapping memory device.

8. The method of claim 1, wherein the information defining memory space attributes include a namespace that maps to a corresponding memory region on one or more corresponding persistent memory devices.

9. The method of claim 8, further comprising, in response to the namespace mapping to a plurality of memory regions associated with a plurality of corresponding persistent memory devices, linking the namespace to each corresponding memory region on each one of the plurality of corresponding persistent memory devices.

10. The method of claim 1, wherein the first indexing map and the subsequent indexing map are Boot Assist Meta-data (BAM) indexing maps each having a first header and a second header, wherein:
the first header is a persistent memory device identifier that is utilized to locate each BAM indexing map where the persistent memory device is indexed;
each first header includes a plurality of entries that identify attributes of a respective persistent memory device, the attributes including a capacity, a type, and a number of entries that are associated with the respective persistent memory device; and
the second header is a namespace identifier that has a plurality of entries that point to a respective namespace that is associated with a memory region on the respective persistent memory device.

11. An Information Handling System (IHS) comprising:
a processor;
a plurality of persistent memory devices coupled to the processor; and
a firmware interface chipset coupled to the processor and comprising a firmware interface that is executed by the processor to cause the processor to:
generate at least one subsequent indexing map that is a duplicate of the first indexing map;
communicatively link the first indexing map to the subsequent indexing map;
distribute the subsequent indexing map to one or more mapping memory devices;
in response to detection of an update to meta-data associated with the information defining memory space attributes during a hardware fault, identify one of the (i) first indexing map and (ii) the subsequent indexing map that is stored on the mapping memory device as a writeable indexing map;
in response to detection of the hardware fault write information defining memory space attributes to at least one of the first indexing map and the subsequent indexing map to generate a master indexing map; and
synchronize, via a runtime operation, the master indexing map with each of the first indexing map and the subsequent indexing map to coordinate changes to the information defining memory space attributes.

12. The IHS of claim 11, wherein, in response to a runtime operation, the firmware interface causes the processor to synchronize one of the first indexing map and the subsequent indexing map with the writeable indexing map to coordinate changes to the information defining memory space attributes, wherein the information defining memory space attributes correspond to one or more of a namespace and a portion of a namespace associated with a respective persistent memory device.

13. The IHS of claim 11, wherein the firmware interface causes the processor to execute the write operation to one of the first indexing map and subsequent indexing map during the hardware fault, when a corresponding one of the first indexing map and the subsequent indexing map is stored on a mapping memory device that is writeable during detection of the hardware fault.

14. The IHS of claim 13, wherein the firmware interface causes the processor to identify the mapping memory device that is writeable from among plurality of mapping memory devices, in response to a selected mapping memory device being unable to receive the write operation.

15. The IHS of claim 13, wherein the hardware fault comprises one or more of a battery power falling below a predetermined threshold, a battery power failure, and a persistent memory device failure.

16. The IHS of claim 11, wherein at least one of the plurality of persistent memory devices coupled to the processor is a non-volatile dual in-line memory module (NVDIMM), and a NVDIMM driver loads the first indexing map to a NVDIMM firmware interface table (NFIT) stored on a first memory device from among the one or more mapping memory devices.

17. The IHS of claim 16, wherein the one or more mapping memory devices are associated with at least one of a NVDIMM controller, baseboard management controller (BMC), and an embedded multi-media controller (eMMC), and wherein a respective controller loads one of the first indexing map and the subsequent indexing map to an associated memory device.

18. The IHS of claim 11, wherein the information defining memory space attributes include a namespace that maps to a corresponding memory region on one or more corresponding persistent memory devices.

19. The IHS of claim 18, wherein, in response to the namespace mapping to a plurality of memory regions associated with a plurality of corresponding persistent memory devices, the firmware interface causes the processor to link the namespace to each one of the corresponding memory regions on each one of the plurality of corresponding persistent memory devices.

20. The IHS of claim 11, wherein the first indexing map and the subsequent indexing map are Boot Assist Meta-data (BAM) indexing maps, and the firmware interface causes the processor to generate the BAM indexing maps, each having a first header and a second header, wherein:
the first header is a persistent memory device identifier that is utilized to locate each BAM indexing map where the persistent memory device is indexed;
each first header includes a plurality of entries that identify attributes of a respective persistent memory device, the attributes including a capacity, a type, and a number of entries that are associated with the respective persistent memory device; and
the second header is a namespace identifier that has a plurality of entries that point to a respective namespace that is associated with a memory region on the respective persistent memory device.

* * * * *